US012701203B2

(12) United States Patent \
Ivgi et al.

(10) Patent No.: US 12,701,203 B2 \
(45) Date of Patent: Aug. 4, 2026

(54) OPTICAL PLATFORM COMPRISING MULTIPLE OPTICAL PROJECTORS

(71) Applicant: INUITIVE LTD., Ra'anana (IL)

(72) Inventors: Mishel Ivgi, Yehud-Monoson (IL); Roni Zuri, Kfar Saba (IL)

(73) Assignee: INUITIVE LTD., Ra'anana (IL)

( * ) Notice: Subject to any disclaimer, the term of this patent is extended or adjusted under 35 U.S.C. 154(b) by 0 days.

(21) Appl. No.: 18/669,813

(22) Filed: May 21, 2024

(65) Prior Publication Data

US 2025/0365394 A1 Nov. 27, 2025

(51) Int. Cl. \
*H04N 9/31* (2006.01)

(52) U.S. Cl. \
CPC ................................. *H04N 9/3147* (2013.01)

(58) Field of Classification Search \
CPC .................................................... H04N 9/3147 \
See application file for complete search history.

(56) References Cited

U.S. PATENT DOCUMENTS

| | | | |
|---|---|---|---|
| 9,857,167 B2 * | 1/2018 | Jovanovski | ........ G01B 11/2518 |
| 2011/0181840 A1 * | 7/2011 | Cobb | ................... H04N 9/3147 |
| | | | 353/31 |
| 2019/0253679 A1 * | 8/2019 | Tsubota | .............. G06F 3/04166 |
| 2019/0285404 A1 * | 9/2019 | Wohlfeld | .................. G06T 7/73 |

FOREIGN PATENT DOCUMENTS

| | | | | |
|---|---|---|---|---|
| CN | 110275381 A | * | 9/2019 | ......... G03B 21/2013 |
| WO | WO-2018224692 A1 | * | 12/2018 | ......... G03B 21/2053 |

* cited by examiner

*Primary Examiner* — Michael Lee \
(74) *Attorney, Agent, or Firm* — FisherBroyles, LLP; Roger L. Browdy; Ronni S. Jillions

(57) ABSTRACT

An optical platform is provided, configured to project an image onto a target, wherein the optical platform comprises a plurality of optical projectors, each configured to project an image onto a target, and wherein each of the plurality of optical projectors is associated with a controllable switch configured to enable or disable operation of a respective optical projector from among the plurality of optical projectors, thereby enabling switching between operative optical projectors while the optical platform remains operative.

9 Claims, 2 Drawing Sheets

OPTICAL PLATFORM COMPRISING MULTIPLE OPTICAL PROJECTORS

TECHNICAL FIELD

The present disclosure generally relates to a optical devices, and more particularly, to an apparatus and a method for projecting images.

BACKGROUND

Hardware stereo 3D systems, rely among others, on using laser generated patterns. The use of such patterns is helpful when using an algorithm configured to enable detecting features by left and right image sensors, when there are no unique identifiable features to be found in the image. For example, when scanning a flat wall, stereo systems cannot properly identify objects appearing in both left and right sensors.

In many cases, a dot pattern is generated by a projector and transmitted towards a target. The dot pattern is fixed and is usually a pseudo-random pattern. Pseudo random patterns are used to facilitate detection of unique groups by a suitable algorithm, that are embedded in images captured by two image capturing sensors. However, as some dot pattern projectors do not project random enough patterns in order to generate a reliable pattern, thus, two projectors are used to improve the pattern obtained. This is done by using an optical apparatus that typically comprises two identical projectors that are installed in a way that there is a slight angle that exists between the physical locations of the two projectors.

Still, the following issues affect the visual system performance and reliability over time and during manufacturing:

1) DOES—Diffractive optical elements (DOEs) are optical components that deflect light into multiple orders at precise angles. Periodicity and their spatial frequencies, rather than the surface topography profile, determine the optical performance. The problem—assembly variations;

2) Problems associated with projector assembly tolerance, using standard SMT processes (XY and angle variation);

3) Thermal expansion as well as heat generated by the module and/or heat generated outside the module, might affect the projected pattern, change the optical characteristics and also degrade the pattern quality;

4) Certain applications require fewer projected dots or larger number of projected dots than other applications, depending on the image resolution for obtaining optimal performance; and 5) Since the projected pattern is a fixed pattern, there are some scenarios, for example edges of objects, that might be erroneously detected. Some areas within the image, might result in an invalid detection while others might be detected as outliers.

SUMMARY OF THE DISCLOSURE

The disclosure may be summarized by referring to the appended claims.

It is an object of the present disclosure to provide an optical apparatus configured to provide an enhanced projecting performance.

It is another object of the present disclosure to provide a novel optical projecting platform which comprises a plurality of light emitting optical projectors, and wherein the optical projecting platform is configured to switch between the operative optical projectors on the fly during the operation of the optical projecting platform.

It is another object of the present disclosure to provide a novel projecting platform which comprises a plurality of light emitting optical projectors each associated with a respective controllable switch, wherein each such switch is configured to enable and disable the operation of the respective light emitting optical projector associated therewith.

It is another object of the present disclosure to provide a novel optical projecting platform which comprises a plurality of light emitting optical projectors that overcomes at least some of the problems described above under the section "Background".

Other objects of the present invention will become apparent from the following description.

In accordance with a first embodiment of the present invention, there is provided an optical platform configured to project an image (e.g. a pattern) onto a target, wherein the optical platform comprises a plurality of optical projectors, each configured to project an image onto a target, and wherein each of the plurality of optical projectors is associated with a controllable switch configured to enable or disable operation of a respective optical projector from among the plurality of optical projectors, thereby enabling switching between operative optical projectors while the optical platform is operative.

The term "optical projectors" or "projectors" as used herein throughout the specification and claims is used to denote a light emitting device such as a pattern projector, or any other applicable light emitting device.

The term "optical plat form" as used herein throughout the specification and claims is used to denote an apparatus such as a 3D sensing platform or any other applicable apparatus that comprises a plurality of light emitting devices (i.e., optical projectors such as pattern projectors).

The term "frame" as used herein throughout the specification and claims is used to denote an image captured during an exposure time. The exposure window defines the integration time of photons by the image capturing sensor (e.g., a camera) and each pixel captured by that image capturing sensor is the integration result of photons captured during the exposure time window from in the smallest addressable element within the image. If the switching of optical projectors is affected between two consecutive frames, as will be explained hereinafter, each captured image in a frame that proceeds the time at which the switch between optical projectors will include the combination of images (e.g., patterns) projected by each of the optical projector(s), and the surrounding within the field of view of the image capturing device. In the case that the switching between optical projectors is affected within a single frame (i.e., within an exposure time window), as will be explained hereinafter, the image captured in that frame during which the switching between optical projectors takes place, will include the combination of images (e.g., patterns) projected by each of the optical projector(s) operative before the switch has been affected, and by each of the optical projector(s) operative after the switch has been affected, as well as of the surrounding included within the field of view of the image capturing device.

According to another embodiment, the images projected at some of the frames, are projected by a single optical projector from among the plurality of optical projectors of the optical platform, whereas images projected at some of the frames are projected by a number of optical projectors from among the plurality of optical projectors of the optical platform.

By yet another embodiment of the present invention, the images projected at at least some of the frames, are projected by at least two of the plurality of optical projectors that are operative simultaneously, wherein each of the operative optical projectors, projects an image at each of the at least some of the frames.

In accordance with still another embodiment of the present disclosure, at least two of the plurality of optical projectors are operative simultaneously at any given time during operation of the optical platform.

According to another embodiment, the plurality of projectors are driven in series by a controlled current source.

By yet another embodiment, each of the plurality of projectors is associated with a bypass controllable switch, which may be either software controlled or hardware controlled, or any combination thereof.

In accordance with another embodiment, the optical platform is further configured to enable switching between optical projectors that project images comprised in two consecutive frames from among the plurality of frames. Optionally, the switching of optical projectors is carried out between consecutive frames, by switching off at least one optical projector operative during projecting an image within a first frame from among the plurality of frames, and switching on at least one other of the plurality of optical projectors, for projecting an image within a second, consecutive frame.

According to another embodiment of the present invention, the optical platform is further configured to enable switching between optical projectors that project images comprised within a single frame from among the plurality of frames. Optionally, the switching of optical projectors is carried out within a single frame by switching off one or more optical projectors, each operative to project a respective image within a first part of a frame, and switching on at least one other of the plurality of optical projectors, for projecting an image within a second part of that frame.

According to a still another embodiment, at least two of the optical projectors operating simultaneously, are configured each to project the same or a different pattern than the pattern projected by another of the plurality of optical projectors.

By yet another embodiment, the switching between operative optical projectors, is carried out either between some consecutive frames or during a single frame, or any combination thereof.

BRIEF DESCRIPTION OF THE DRAWINGS

For a more complete understanding of the present invention, reference is now made to the following detailed description taken in conjunction with the accompanying drawing wherein.

4 comprised in an optical platform, construed in accordance with another embodiment of the present disclosure.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

Figure 1:
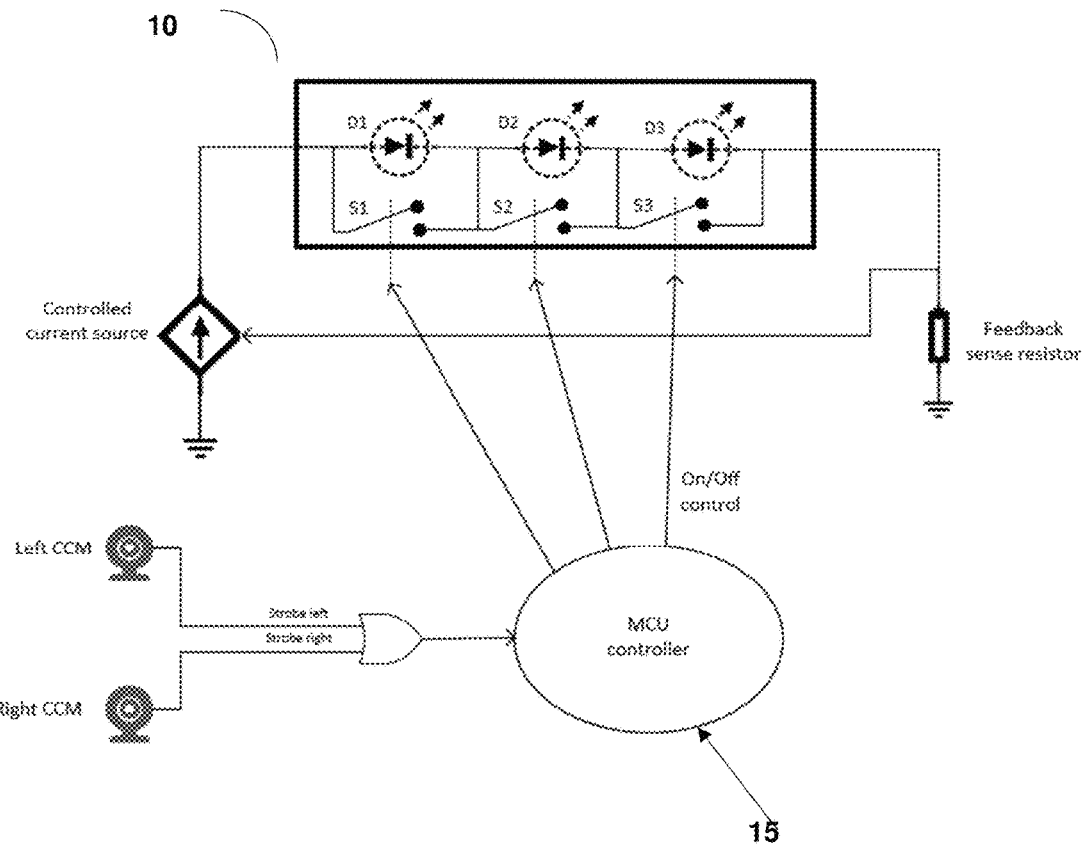
FIG. 1—demonstrates an exemplary optical platform that comprises multiple optical projectors for implementing a switching mechanism between operating optical projectors, construed in accordance with an embodiment of the present disclosure.

FIG. 1 illustrates an example of an optical platform 10 adapted to be used in stereo vision systems. The optical platform 10 disclosed herein is configured to project an image (e.g. a pattern) onto a target within a time exposure window. Optical platform 10 exemplifies the use of three optical projectors D1, D2 and D3 (e.g., pattern projectors) connected in series, each configured to project an image onto the target, and wherein each of the plurality of optical projectors D1, D2 and D3 is associated with a respective controllable switch S1, S2 and S3, each configured to enable or disable, as the case may be, the operation of its associated optical projector.

An optical projector such as a pattern projector may comprise a light source, one or more optical components, and a package (housing). The purpose of such a device is to project a light pattern. This typically may be achieved by manipulating light emitted from a source or an array of sources, and shaping it into the desired pattern at the desired intensity. In numerous projector modules, a laser or array of lasers utilized, optionally a lens and a pattern-shaping element, a micro-structured optical element, such as a diffuser or DOE.

The disabling of the operation of one or more of the currently operative optical projectors, while enabling the operation of one or more other optical projectors, is carried out by controller 15 and the result obtained is switching between operative optical projectors while the optical platform 10 itself continues with its operation. Although the description herein refers to the fact that optical platform 10 itself continues with its operation, (i.e., remains operative), it should be noted that there is not a continuous output of image(s) by the projectors, as in order to preserve energy, the various optical projectors project their respective images only during the relevant exposure time, defined for a frame.

The proposed solution is suitable for a number of cases among which for example are systems requiring more than a single optical projector in order to achieve projection of an optimized pattern, by using optical projectors, each associated with at least one controllable switch, thereby enabling or disabling the operation of each individual optical projector. This solution enhances the stereo visual system's performance and may overcome at least some of the problems associated with prior art solutions.

As shown in FIG. 1, the optical projectors comprised in the optical platform are driven in series by a controlled current source.

Figure 2:
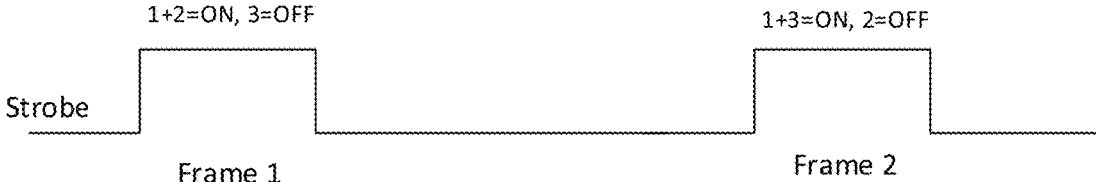
FIG. 2—illustrates an exemplary mode of implementing a switching mechanism between operating optical projectors comprised in an optical platform, construed in accordance with an embodiment of the present disclosure.
Figure 3:
FIG. 3 illustrates an exemplary mode of implementing a switching mechanism between operating optical projectors

In example embodiments illustrated in FIG. 2 and FIG. 3, three optical projectors are demonstrated. Obviously, more than three optical projectors may be installed in such an optical platform. Each optical projector is associated with a bypass switch which may be controlled either by software or by hardware.

The projectors' switching can be done by implementing either one of the following two operating modes, or any combination thereof. One of these two operating modes refers to switching between optical projectors where the switching is affected between two consecutive frames, while the other operating mode refers to switching between optical projectors during that takes place within a single frame.

The first switching mode is described in the following example. By this mode, the optical platform is configured to switch between optical projectors that project images comprised in two consecutive frames. This switching between optical projectors is carried out between two consecutive frames, by switching off at least one optical projector operative for projecting an image within a first frame, and switching on at least one other of the plurality of optical projectors, that will project an image within a second, consecutive frame.

In other words, in at least two of the frames, there is a different set of one or more operative optical projectors. Obviously, as will be appreciated by those skilled in the art, a different set comprising one or more optical projectors may be operative in each of the frames. Such a set of optical projectors may comprise a single optical projector or any possible combination of the 3 optical projectors to which the present example relates. As may be seen in FIG. 2, in the first frame optical projectors 1+2 are operative (i.e. optical projectors 1 and 2 are at ON state) whereas optical projector No. 3 is at OFF state. As depicted in FIG. 2, in the next frame, optical projectors No. 1 continues its operation, while optical projector No. 2 is turned off and optical projector No. 3 is turned on. The is no limit on the number of the number of such switching events that take place. Obviously, there is no requirement for a change to take place between each pair of consecutive frames, and there is no constraint as to which optical projectors will be turned on by using the controllable switch or which of the operative optical projectors will be turned off when the switching will take place.

According to another embodiment of the present disclosure, the optical platform is configured to implement a second mode of switching between operative optical projectors, by which the switching is affected while projecting images comprised within a single frame. By this operating mode, the switching between the optical projectors is carried out within a single frame by switching off one or more optical projectors operative by projecting each a respective image in a first part of a frame, and switching on at least one other optical projector, for projecting an image within a second part of that frame.

In other words, the second operating mode, by which the switching between the operating optical projectors a single frame, is particularly takes place within suitable for global shutter sensors. According to this switching mode, the projectors are switched within the same frame, so that during a first part of a frame (e.g., the first half of the exposure time), one set of optical projectors is operative and during the second part thereof, another set of optical projectors is operative. A set being any number of optical projectors from 1 to the total number of optical projectors comprised in the optical platform. In the example illustrated in FIG. 3, during the first part of the first exposure time (i.e., the first frame), optical projectors No. 1 and No. 2 are enabled (being in ON state) while optical projector No. 3 is disabled (at OFF state). During the second part of that first exposure time (first frame) optical projectors No. 1 and No. 3 are operative whereas optical projector No. 2 is disabled. During the first part of the second exposure window (second frame) optical projectors No. 1 and No. 3 are operative while optical projector No. 2 is disabled. After carrying out the switching, optical projectors No. 1 and optical projector No. 2 operative within the second part of the second exposure window, whereas optical projector 3 is disabled during that second part of the second exposure window.

As explained above, any combination of switching mode 1 and 2 may be implemented while projecting the images, e.g., a first switching mode will be implemented between two consecutive frames, while after few frames, when a further switch is required, that second switch will be carried out in within a single frame, all without departing from the scope of the invention.

In accordance with another embodiment, a temporal filter is used on depth obtained data to filter out invalid depths, outliers and improve the results obtained at the edges of the images.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. An optical platform configured to project image onto a target, wherein the optical platform comprises a plurality of optical projectors, each configured to project an image that covers the whole field of view onto said target, wherein each of the plurality of optical projectors is associated with a controllable switch which is configured to enable or disable operation of a respective optical projector from among said plurality of optical projectors, thereby enabling switching between operative optical projectors while said optical platform remains operative and wherein the switching of optical projectors is carried out within a single time frame, being an exposure time window, by switching off any one or more optical projectors from among the plurality of optical projectors comprised in said optical platform which are operative within a first part of a time frame, and switching on any one or more currently non-operating optical projectors from among the plurality of optical projectors comprised in said optical platform, to operate within a second part of said time frame.

2. The optical platform of claim 1, wherein images projected at at least some of the time frames are projected by a single optical projector from among the plurality of optical projectors.

3. The optical platform of claim 1, wherein images projected at at least some of the time frames, are projected by at least two of the plurality of optical projectors that are operative simultaneously, wherein each of the operative optical projectors, projects an image at each of said at least some of the time frames.

4. The optical platform of claim 1, wherein at least two of the plurality of optical projectors are operative simultaneously at any given time during operation of said optical platform.

5. The optical platform of claim 1, wherein said plurality of projectors are driven in series by a controlled current source.

6. The optical platform of claim 1, wherein each of said plurality of projectors is associated with a bypass controllable switch.

7. The optical platform of claim 1, further configured to switch between optical projectors that project images comprised in two consecutive time frames from among the plurality of time frames.

8. The optical platform of claim 7, wherein in a case that the switching of optical projectors is carried out between two consecutive time frames, by switching off a single optical projector operative for projecting an image within a first time frame from among the plurality of time frames, and switching on at least two of the plurality of optical projectors, for projecting an image within a second, consecutive time frame.

9. The optical platform of claim 1, wherein at least two of the optical projectors operating simultaneously, are configured each to project the same or a different pattern than another of the plurality of optical projectors.

* * * * *